No. 805,916. PATENTED NOV. 28, 1905.

H. L. JINKS.

NUT LOCK.

APPLICATION FILED JUNE 1, 1905.

Witnesses:

Louis H. Schmidt.

K. G. Whitcomb

Inventor

H. L. Jinks

By Swift & Co.

Attorneys

UNITED STATES PATENT OFFICE.

HENRY LEONARD JINKS, OF CROWELL, TEXAS.

NUT-LOCK.

No. 805,916. Specification of Letters Patent. Patented Nov. 28, 1905.

Application filed June 1, 1905. Serial No. 263,312.

*To all whom it may concern:*

Be it known that I, HENRY LEONARD JINKS, a citizen of the United States, residing at Crowell, in the county of Foard and State of Texas, have invented a new and useful Nut-Lock; and I do hereby declare the following to be a full, clear, and exact description of the invention, such as will enable others skilled in the art to which it appertains to make and use the same.

The invention relates to a nut-lock, and has for its object to provide a device of this character of simple, durable, and inexpensive construction.

A further object of the invention is to provide a device of this character which may be used as an ordinary bolt and nut and which can be used with or without the hereinafter-mentioned locking-pin.

With these and other objects in view the invention consists in the novel construction and arrangements of parts hereinafter described and shown, and particularly pointed out in the appended claims.

Figure 1:
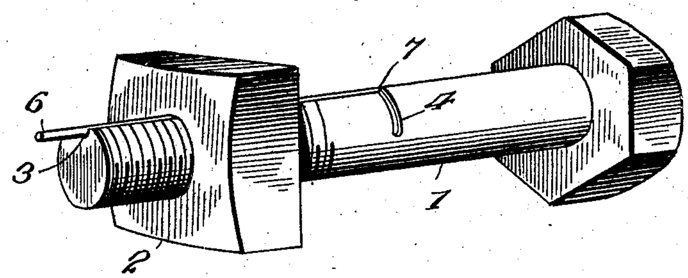
Figure 2:
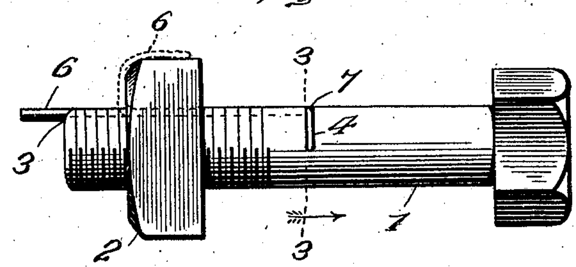
Figure 3:
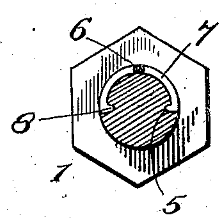
Figure 4:
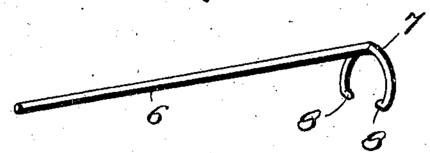
Figure 5:
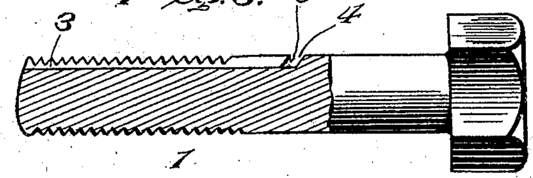

In the drawings forming part of this specification, and in which like numerals of reference designate corresponding parts, Figure 1 is a perspective view of a nut-lock constructed in accordance with this invention. Fig. 2 is a top plan view, the locking-pin shown bent in dotted lines. Fig. 3 is a sectional view on line 3 3 of Fig. 2. Fig. 4 is a detail view of the locking-pin. Fig. 5 is a longitudinal sectional view of the bolt.

Referring to the drawings, 1 designates a bolt having a nut of the ordinary construction. The bolt 1 is provided with a longitudinal groove 3, which begins at a point between the threaded portion of said bolt and the head thereof and which connects with a transverse groove 4. The transverse groove 4 is provided with recesses 5 for a purpose hereinafter explained. The nut is effectively locked by means of a locking-pin 6, having a head which is adapted to fit into the grooves 3 and 4, as will be readily understood. The head 7 is provided with projections 8, which are adapted to engage the recesses 5, whereby the locking-pin is yieldably clamped to the bolt 1 and by reason of which projections engaging said recesses 5 the locking-pin is clamped to the bolt as a safeguard against being lost when the nut is disengaged from the bolt. The walls of the transverse groove 4 are inclined for the purpose of providing shoulders 9, whereby the locking-pin will be firmly locked to the bolt 1 when the outer end of said locking-pin is bent over the nut.

It will thus be seen that the nut-lock is exceedingly simple, effective, and durable, and I desire it to be distinctly understood that changes in the form, proportion, and minor details of construction may be resorted to without departing from the spirit of the invention.

What I claim is—

1. A nut-lock comprising a nut, a bolt, said bolt being provided with a transverse groove having inclined walls connected with a longitudinal groove, a locking-pin adapted to fit into said grooves and having a flexible end adapted to lock said nut, substantially as described.

2. A nut-lock comprising a nut, a bolt having a longitudinal groove, and a transverse groove, said transverse groove being provided with inclined walls, a locking-pin adapted to fit into said grooves, and engaging one of said inclined walls whereby said pin will be firmly locked to the bolt, and means for locking said nut, substantially as described.

3. A nut-lock comprising a nut, a bolt having a longitudinal groove terminating at its inner end in a transverse groove, said transverse groove terminating in recesses, a locking-pin having a resilient cross-head, said cross-head being provided with a pair of projections engaging recesses on opposite sides of said bolt, substantially as and for the purpose described.

4. A nut-lock comprising a nut, a bolt, having a longitudinal groove terminating in a transverse groove, said transverse groove having inclined walls, an approximately T-shaped locking-pin adapted to fit into said grooves, substantially as described.

In testimony whereof I have hereto affixed my signature in the presence of witnesses.

HENRY LEONARD JINKS.

Witnesses:

ROBT. M. MAGEE,
J. M. HILL,
C. R. FERGESON.